US011638257B2

(12) United States Patent
Määttänen et al.

(10) Patent No.: US 11,638,257 B2
(45) Date of Patent: Apr. 25, 2023

(54) FLIGHT PATH PLAN AVAILABILITY INDICATION

(71) Applicant: Telefonaktiebolaget LM Ericsson (publ), Stockholm (SE)

(72) Inventors: Helka-Liina Määttänen, Helsinki (FI); Siva Muruganathan, Stittsville (CA); Zhenhua Zou, Solna (SE); Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/733,918

(22) PCT Filed: Jun. 3, 2019

(86) PCT No.: PCT/IB2019/054589
§ 371 (c)(1),
(2) Date: Dec. 1, 2020

(87) PCT Pub. No.: WO2019/234592
PCT Pub. Date: Dec. 12, 2019

(65) Prior Publication Data
US 2021/0227534 A1   Jul. 22, 2021

Related U.S. Application Data

(60) Provisional application No. 62/680,336, filed on Jun. 4, 2018.

(51) Int. Cl.
*H04W 4/42* (2018.01)
*H04W 72/04* (2023.01)
(Continued)

(52) U.S. Cl.
CPC ......... *H04W 72/048* (2013.01); *H04W 4/024* (2018.02); *H04W 4/42* (2018.02); *H04W 8/08* (2013.01); *H04W 72/0413* (2013.01)

(58) Field of Classification Search
CPC ..... H04W 72/048; H04W 4/42; H04W 4/024; H04W 8/08; H04W 72/0413;
(Continued)

(56) References Cited

U.S. PATENT DOCUMENTS 7,212,135 B1\* 5/2007 Lynch ................. G08G 5/0065
701/16
2014/0229097 A1\* 8/2014 Bailey ................ G08G 5/0013
701/400
(Continued)

FOREIGN PATENT DOCUMENTS

WO    2018061502 A1    4/2018

OTHER PUBLICATIONS

PCT International Search Report and Written Opinion dated Jul. 19, 2019 for International Application No. PCT/IB2019/054589, 15 pages.
(Continued)

*Primary Examiner* — Marcus Hammonds
(74) *Attorney, Agent, or Firm* — Sage Patent Group

(57) ABSTRACT

A method, system and apparatus are disclosed. A base station configured to communicate with a wireless device (UE) is provided. The base station is configured to, and/or comprise a radio interface and/or comprising processing circuitry configured to configure the UE to transmit an indicator associated with flight information in a predefined message associated with UE assistance information, and receive the predefined message, the predefined message including the indicator associated with the flight information.

13 Claims, 6 Drawing Sheets

(51) Int. Cl.
*H04W 4/024* (2018.01)
*H04W 8/08* (2009.01)

(58) Field of Classification Search
CPC ... H04W 24/10; G08G 5/0039; G08G 5/0034; G08G 5/0082; G08G 5/0069; G08G 5/0013
See application file for complete search history.

(56) References Cited

U.S. PATENT DOCUMENTS

| | | | |
|---|---|---|---|
| 2016/0093217 A1* | 3/2016 | Hale | G08G 5/0091 |
| | | | 701/120 |
| 2016/0357192 A1* | 12/2016 | McGrew | G05D 1/0022 |
| 2018/0049225 A1 | 2/2018 | Lee et al. | |
| 2018/0275647 A1* | 9/2018 | Li | G05D 1/0044 |
| 2018/0342166 A1* | 11/2018 | Borgyos | G01C 23/00 |
| 2019/0180633 A1 | 6/2019 | Yoshizawa et al. | |
| 2021/0201685 A1* | 7/2021 | Han | G08G 5/0039 |

OTHER PUBLICATIONS

LG Electronics Inc., 3GPP TSG-RAN WG2 Meeting #102, R2-1808609, "Enhancement to History Information for Aerial UE", Revision of R2-1806137, Busan, Republic of Korea, May 21-25, 2018, 3 pages.

Huawei, 3GPP TSG-RAN WG2 #102, R2-1807475, "Report of Email Discussion [101bis#57][LTE/UAV] Flight Path Information", LTE_Aerial-Core—Release 15, Busan, Republic of Korea, May 21-25, 2018, 9 pages.

Lenovo et al., 3GPP TSG-RAN WG2 Meeting #100, R2-1713314, Revision of R2-1711379, "Discussion for Status Management for Aerial UE", Reno, USA, Nov. 27-Dec. 1, 2017, 3 pages.

Fraunhofer HHI et al., 3GPP TSG-WG2 Meeting #102, R2-1807212, "Flight Path Information Report: Trigger and Content", Busan, Republic of Korea, May 21-25, 2018, 5 pages.

Ericsson, 3GPP TSG RAN Meeting #80, RP-181046, "New WID on Further Enhanced LTE Support for Aerial Vehicles", La Jolla, CA, US, Jun. 11-14, 2018, 5 pages.

Ericsson, 3GPP TSG RAN Meeting #80, RP-17xxxx, "New WID on NR Support for Aerial Vehicles", La Jolla, CA, US, Jun. 11-14, 2018, 4 pages.

* cited by examiner

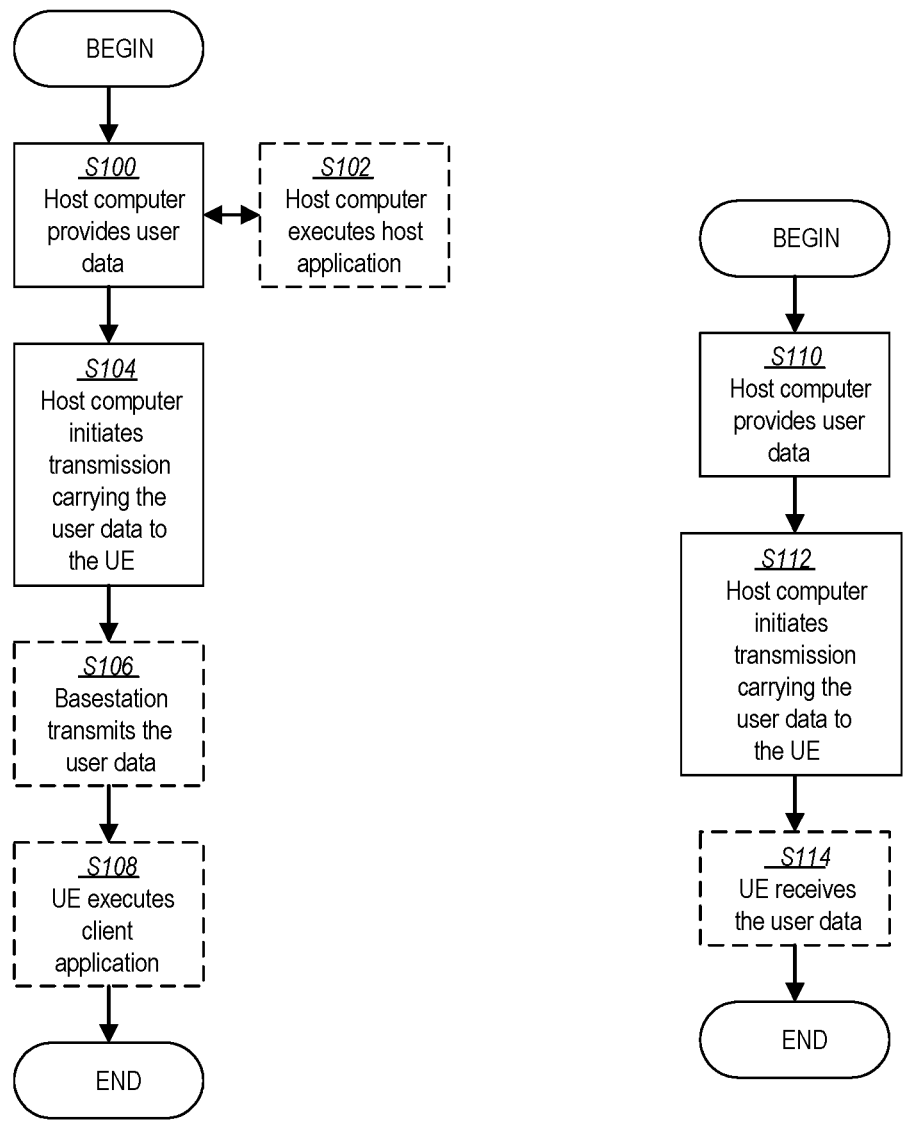

FLIGHT PATH PLAN AVAILABILITY INDICATION

CROSS-REFERENCE TO RELATED APPLICATIONS

This application is a 35 U.S.C. § 371 national stage application for International Application No. PCT/IB2019/054589, entitled "FLIGHT PATH PLAN AVAILABILITY INDICATION", filed on Jun. 3, 2019, which claims priority to U.S. Provisional Patent Application No. 62/680,336, filed on Jun. 4, 2018, the disclosures and contents of which are hereby incorporated by reference in their entireties.

FIELD

The present disclosure relates to wireless communications, and in particular, to providing flight information in a predefined message associated with user equipment (UE) assistance information.

BACKGROUND

A Third Generation Partnership Project (3GPP, a standardization organization) Technical Specification (TS) Release-15 item (3GPP Release 15 item) is under study that relates to enhanced Long Term Evolution (LTE) support for aerial vehicles is based on the preceding study such as a study documented in 3GPP Technical Report (TR) 36.777 v 15.1.0. The 3GPP Release 15 item aims to specify features that can improve the efficiency and robustness of terrestrial LTE network for providing aerial connectivity services such as for low altitude unmanned aerial vehicles (e.g., drones).

Among other things, in the 3GPP Release 15 item, Radio Resource Control (RRC) signaling support for obtaining flight path plan or flight path information from the user equipment (UE) was described. For 3GPP Technical Standard (TS) 36.300 v 15.1.0, the following description has been proposed:

23.X.5 Flight Path Information Reporting

Evolved Terrestrial Radio Access Network (E-UTRAN) may request a UE to report flight path information consisting of a number of waypoints defined as three dimensional (3D) locations as defined in 3GPP TS 36.355 v 15.1.0. A UE reports up to a configured number of waypoints if flight path information is available at the UE. The report can also consist of time stamps per waypoint if configured in the request and if available at the UE.

The availability of flight path plan in 3GPP TS Release 15 may likely be added to RRC connection reconfiguration complete message that is described in the following example:
RRCConnectionReconfigurationComplete Message

---

-- ASN1START
......(omit parameters that are not changed)......
RRCConnectionReconfigurationComplete-v1510-IEs ::= SEQUENCE {
scg-ConfigResponseNR-r15 OCTET STRING OPTIONAL,
flightPathInformationAvailable
ENUMERATED {true} OPTIONAL
nonCriticalExtension SEQUENCE {} OPTIONAL
}
---ASN1STOP

---

3GPP TS Release 15 may be based on a network requesting the flight path information and based on the availability of flight path plan information possibly being added to the RRCconfigurationComplete message. From existing wireless communication standards such as 3GPP TS 36.331 v 15.1.0, the RRCConnectionReconfigurationComplete message may already include a variety of information availability indications such as one of more of rlf-InfoAvailable-r10, logMeasAvailable-r10, connEstFailInfoAvailable-r11, logMeasAvailableMBSFN-r12, etc.

Thus, in 3GPP TS Release 15, the network may receive an indication of the availability of flight path information at the UE only after RRC reconfiguration. This approach can be disadvantageous considering the following: generally, a UE may obtain initial or updated flight path information via application layer. In this case, the network may not know of an updated flight path plan at a UE has become available unless the UE performs an RRC reconfiguration, which is inflexible.

SUMMARY

Some embodiments advantageously provide methods, systems, and apparatuses for providing flight information (e.g., flight path plan, flight path, etc.) in a predefined message associated with UE assistance information.

Some embodiments of the disclosure relate to adding updated flight path information to the 'UE Assistance information' information element (IE) described in a wireless communication standard such as in 3GPP TS 36.331 v 15.1.0 standard where the UE can indicate to the network or base station any updates to its flight path plan. In other words, in one or more embodiments, an existing IE such as a UE assistance information IE ("UEAssistanceInformation") that may be used to provide listed information from the UE to the network node is modified to include updated flight path information and/or other information described herein. In one or more embodiments, the modified UE assistance information IE may provide information associated with its original configuration and may also include flight path information associated with its modified configuration such that functionality is being added to the IE. The one or more embodiments on what information may be added to 'UE assistance information' IE are summarized below:

A Boolean value indicating flight path information is either available or not available.

A Boolean indication flight path information has been updated.

An indicator for indicating if the entire flight path plan has changed or not.

An indicator for indicating if new waypoints are available and which previously indicated waypoints are valid.

An indicator for indicating the updated number of waypoints available at the UE (i.e., as part of the updated flight path plan information) and/or an indicator for indicating if the updated number of waypoints is more than the previously indicated number of waypoints.

An indicator corresponding to an amount of new waypoints and indicating if some old waypoints are not valid anymore.

An indicator for indicating if time stamps of some waypoints have changed.

An indicator to indicate if an updated waypoint is available which deviates from the corresponding previously indicated waypoint by a predefined threshold.

An indicator to indicate if an update to a time stamp of a waypoint is available which deviates from the corresponding previously indicated time stamp of the waypoint by a predefined threshold.

A priority bit to indicate if the immediate route of the UE has changed significantly or changed by one or more predefined quantities.

One bit that can indicate invalidation of the previous flight path information.

According to one aspect of the disclosure, a user equipment comprising processing circuitry configured to: determine whether to transmit an indication indicating that flight path information at least one of is available and has changed, and transmit, in connected mode, the indication based at least in part on the determination.

According to one or more embodiments of this aspect, the indication is included in an information element (IE) configured to provide assistance information where the assistance information is associated with at least one of power preference indications, bandwidth preference information, semi-persistent scheduling (SPS) information, radio link monitoring (RLM) events, delay budget report and overheating assistance information. According to one or more embodiments of this aspect, the indication indicates waypoint information associated with the flight plan information. According to one or more embodiments of this aspect, the determination whether to transmit the indication is based at least in part on whether an update to the flight path information is received from an application layer.

According to one or more embodiments of this aspect, the waypoint information indicates at least one of: if new waypoints are available; which previously indicated waypoints are valid; an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments of this aspect, connected mode corresponds to radio resource control (RRC) connected mode.

According to another aspect of the disclosure, a base station comprising processing circuitry configured to receive an indication from a user equipment in connected mode, the indication indicating that flight path information at least one of is available and has changed.

According to one or more embodiments of this aspect, the indication is included in an information element (IE) configured to provide assistance information where the assistance information being associated with at least one of power preference indications, bandwidth preference information, semi-persistent scheduling (SPS) information, radio link monitoring (RLM) events, delay budget report and overheating assistance information. According to one or more embodiments of this aspect, the indication indicates waypoint information associated with a flight plan. According to one or more embodiments of this aspect, the waypoint information indicates at least one of: if new waypoints are available; which previously indicated waypoints are valid; an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments of this aspect, connected mode corresponds to radio resource control (RRC) connected mode.

According to another aspect of the disclosure, a method implemented in a user equipment is provided. A determination is performed whether to transmit an indication indicating that flight path information at least one of is available and has changed. The indication is transmitted in connected mode based at least in part on the determination.

According to one or more embodiments of this aspect, the indication is included in an information element (IE) configured to provide assistance information where the assistance information is associated with at least one of power preference indications, bandwidth preference information, semi-persistent scheduling (SPS) information, radio link monitoring (RLM) events, delay budget report and overheating assistance information. According to one or more embodiments of this aspect, the indication indicates waypoint information associated with the flight plan information.

According to one or more embodiments of this aspect, the determination whether to transmit the indication is based at least in part on whether an update to the flight path information is received from an application layer. According to one or more embodiments of this aspect, the waypoint information indicates at least one of: if new waypoints are available; which previously indicated waypoints are valid; an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments of this aspect, connected mode corresponds to radio resource control (RRC) connected mode.

According to another aspect of the disclosure, a method implemented in a base station is provided. An indication is received from a user equipment in connected mode where the indication indicates that flight path information at least one of is available and has changed.

According to one or more embodiments of this aspect, the indication is included in an information element (IE) configured to provide assistance information where the assistance information is associated with at least one of power preference indications, bandwidth preference information, semi-persistent scheduling (SPS) information, radio link monitoring (RLM) events, delay budget report and overheating assistance information. According to one or more embodiments of this aspect, the indication indicates waypoint information associated with a flight plan. According to one or more embodiments of this aspect, the waypoint information indicates at least one of: if new waypoints are available; which previously indicated waypoints are valid;

an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments of this aspect, connected mode corresponds to radio resource control (RRC) connected mode.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a base station and a user equipment for executing a client application at a user equipment according to some embodiments of the present disclosure;

FIG. 4 is a flowchart illustrating exemplary methods implemented in a communication system including a host computer, a base station and a user equipment for receiving user data at a user equipment according to some embodiments of the present disclosure;

DETAILED DESCRIPTION

Figure 1:
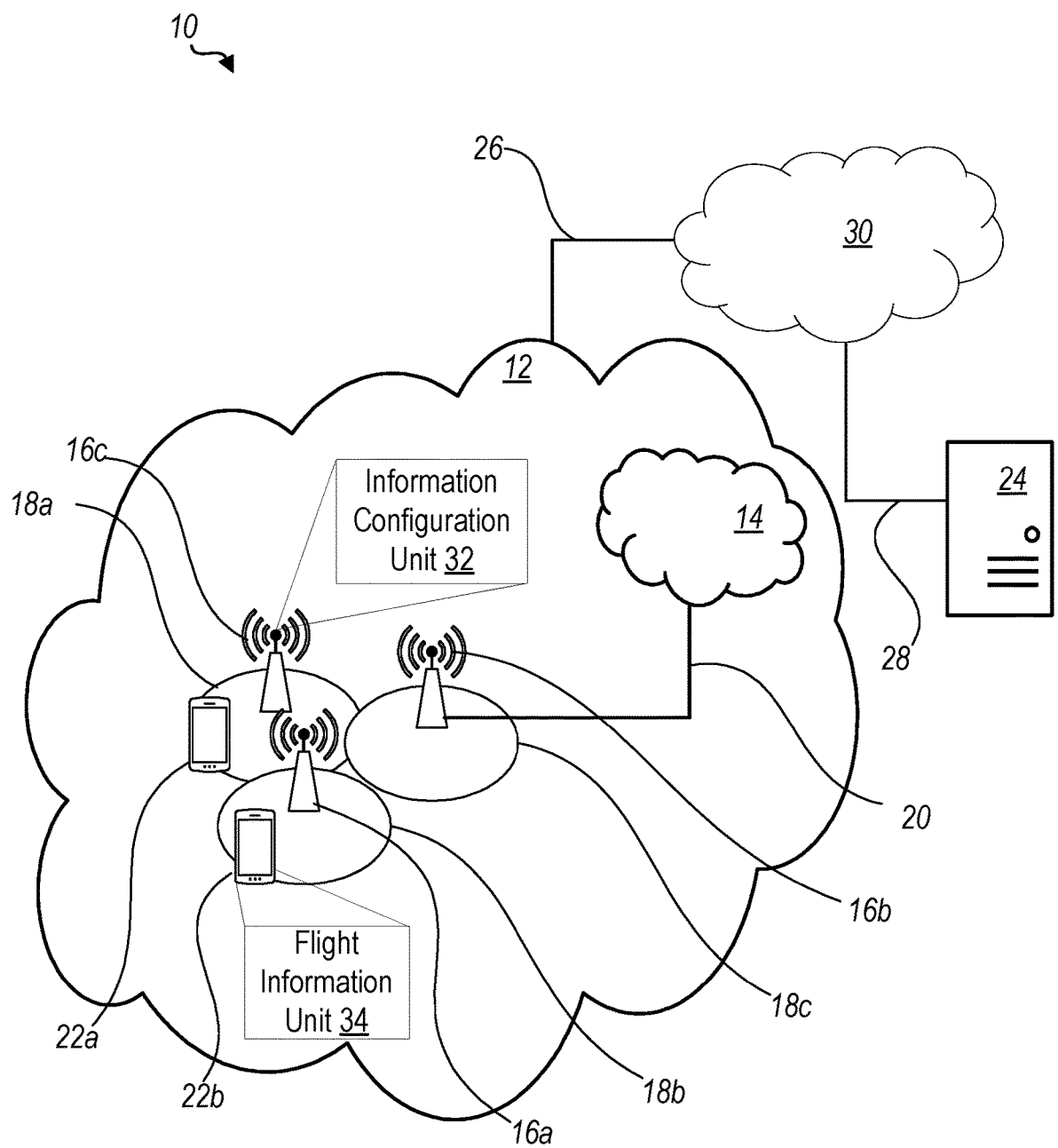
FIG. 1 is a schematic diagram of an exemplary network architecture illustrating a communication system connected via an intermediate network to a host computer according to the principles in the present disclosure.

Some embodiments described herein provide for efficient flight path fetching or retrieval from a UE such that that base station/network receives an indication when or in response to the UE receiving updates for the flight path information of the UE. Some embodiments described herein may also enable the base station/network to retrieve information on what kind of updates the UE has received to the flight path information of the UE. Further, since the UE may not send flight path waypoints autonomously, when new flight path information is available, the base station is able to control when the UE sends updates to its flight path information. Furthermore, some embodiments may provide more flexibility for the base station for determining if a UE has updated flight path information at the UE when compared to wireless communication standards such as 3GPP TS Release 15 that rely on RRC reconfiguration signaling for providing such updated flight path information.

Before describing in detail exemplary embodiments, it is noted that the embodiments reside primarily in combinations of apparatus components and processing steps related to providing flight information in a predefined message associated with UE assistance information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB, or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station gNB, or eNodeB, may be adapted to provide and/or define and/or control one or more cells, e.g., a PCell and/or a LA cell.

Configuring a terminal or user equipment or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or user equipment. Configuring a node or terminal or user equipment by another device or node or a network may refer to and/or comprise transmitting information and/or data and/or instructions to the user equipment or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the user equipment). Alternatively, or additionally, configuring a radio node, e.g., by a base station 16 or other device, may include receiving configuration data and/or data pertaining to configuration data, e.g., from another node like a base station, which may be a higher-level node of the network, and/or transmitting received configuration data to the radio node. Accordingly, determining a configuration and transmitting the configuration data to the radio node may be performed by different network nodes/base stations or entities, which may be able to communicate via a suitable interface, e.g., an X2 interface in the case of LTE or a corresponding interface for NR. Configuring a terminal (e.g. user equipment) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. user equipment) may comprise configuring the user equipment to perform certain measurements on certain subframes or radio resources and reporting such measurements according to embodiments of the present disclosure.

In some embodiments described herein, the term "coupled," "connected," and the like, may be used herein to indicate a connection, although not necessarily directly, and may include wired and/or wireless connections.

The term "base station" used herein can be any kind of base station comprised in a radio network which may further comprise any of network node, radio base station, base transceiver station (BTS), base station controller (BSC), radio network controller (RNC), g Node B (gNB), evolved Node B (eNB or eNodeB), Node B, multi-standard radio (MSR) base station such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The base station may also comprise test equipment. The term "base station" used herein may be used to also denote a user equipment such as a wireless device (WD) or a radio network node.

In some embodiments, the non-limiting terms wireless device (WD) or a user equipment (UE) are used interchangeably. The UE herein can be any type of wireless device capable of communicating with a base station or another UE over radio signals, such as wireless device (UE). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a base station may be distributed over a plurality of wireless devices and/or base stations. In other words, it is contemplated that the functions of the base station and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The disclosure is described within the context of LTE, i.e., E-UTRAN. However, it should be understood that the problems and solutions described herein are equally applicable to wireless access networks and user equipments (UEs) implementing other access technologies and standards. LTE is used as an example technology where the invention is suitable, and using LTE in the description therefore is particularly useful for understanding the problem and solutions solving the problem.

Embodiments allow for providing flight information in a predefined message associated with UE assistance information such that flight information may be provided one or more instances associate with messages such as RRC Reconfiguration Complete message, RRC setup complete message, RRC reestablishment complete message and RRC resume compete message, among possibly other RRC messages.

Returning to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of base stations 16a, 16b, 16c (referred to collectively as base stations 16), such as network nodes, NBs, eNBs, gNBs or other types of wireless access points, each defining a corresponding coverage area 18a, 18b, 18c (referred to collectively as coverage areas 18). Each base station 16a, 16b, 16c is connectable to the core network 14 over a wired or wireless connection 20. A user equipment (UE) 22a located in coverage area 18a is configured to wirelessly connect to, or be paged by, the corresponding base station 16c. A second UE 22b in coverage area 18b is wirelessly connectable to the corresponding base station 16a. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding base station 16. Note that although only two UEs 22 and three base station 16 are shown for convenience, the communication system may include many more UEs 22 and base station 16.

Also, it is contemplated that a UE 22 can be in simultaneous communication and/or configured to separately communicate with more than one base station 16 and more than one type of base station 16. For example, a UE 22 can have dual connectivity with a base station 16 that supports LTE and the same or a different base station 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a base station 16 may not or need not be informed about the past routing of an incoming downlink communication with data originating from a host computer 24 to be forwarded (e.g., handed over) to a connected UE 22a. Similarly, the base station 16 need not be aware of the future routing of an outgoing uplink communication originating from the UE 22a towards the host computer 24.

A base station 16 includes an information configuration unit 32 which is configured to configure the UE 22 to transmit an indicator associated with flight information such as flight path plan or flight path information in a predefined message associated with UE assistance information, and receive the predefined message, the predefined message including the indicator associated with the flight information. A user equipment 22 is configured to include a flight information unit 34 which is configured to receive at least one update to flight information associated with the UE 22, and determine whether to transmit an indicator associated with the at least one update to the flight information in a predefined message associated with UE 22 assistance information.

Example implementations, in accordance with an embodiment, of the UE 22, base station 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the base station 16 and or the user equipment 22. The processing circuitry 42 of the host computer 24 may include an information unit 54 configured to enable the service provider to provide flight information to/from one or more of UE 22 and base station 16. In one or more embodiments, information unit 54 may be configured to perform one or more functions of base station 16 as described herein.

The communication system 10 further includes a base station 16 provided in a communication system 10 and comprising hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the base station 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the base station 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the base station 16 further has software 74 stored internally in, for example, memory 72, or stored in external memory (e.g., database, storage array, network storage device, etc.) accessible by the base station 16 via an external connection. The software 74 may be executable by the processing circuitry 68. The processing circuitry 68 may be configured to control any of the methods and/or processes described herein and/or to cause such methods, and/or processes to be performed, e.g., by base station 16. Processor 70 corresponds to one or more processors 70 for performing base station 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to base station 16. For example, processing circuitry 68 of the base station 16 may include information configuration unit 32 configured to configure the UE to transmit an indicator associated with flight information in a predefined message associated with UE assistance information, and receive the predefined message, the predefined message including the indicator associated with the flight information, as described herein.

The communication system 10 further includes the UE 22 already referred to. The UE 22 may have hardware 80 that may include a radio interface 82 configured to set up and maintain a wireless connection 64 with a base station 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include a flight information unit 34 configured to receive at least one update to flight information associated with the UE, and determine whether to transmit an indicator associated with the at least one update to the flight information in a predefined message associated with UE assistance information, as described herein.

Figure 2:
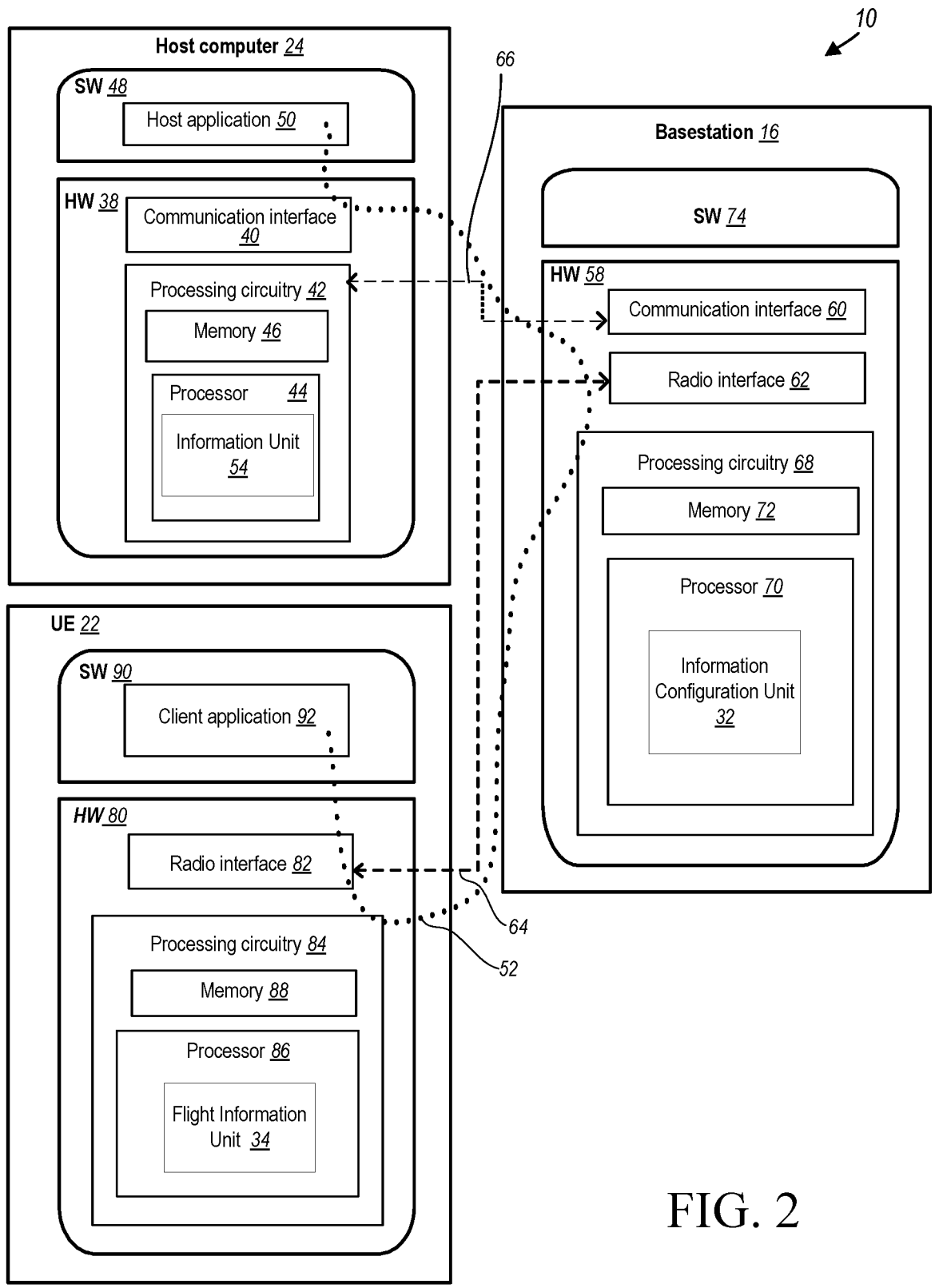
FIG. 2 is a block diagram of a host computer communicating via a base station with a user equipment over an at least partially wireless connection according to some embodiments of the present disclosure.

In some embodiments, the inner workings of the base station 16, UE 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the user equipment 22 via the base station 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the base station 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the base station 16, and it may be unknown or imperceptible to the base station 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the base station 16 with a radio interface 62. In some embodiments, the base station 16 is configured to, and/or the base station's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a base station 16. In some embodiments, the UE 22 is configured to, and/or comprises a radio interface 82 and/or processing circuitry 84 configured to perform the functions and/or methods described herein for preparing/initiating/maintaining/supporting/ending a transmission to the base station 16, and/or preparing/terminating/maintaining/supporting/ending in receipt of a transmission from the base station 16.

Although FIGS. 1 and 2 show various "units" such as information configuration unit 32, and flight information unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a base station 16 and a UE 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the UE 22 (block S104). In an optional third step, the base station 16 transmits to the UE 22 the user data which was carried in the transmission that the host computer 24 initiated, in accordance with the teachings of the embodiments described throughout this disclosure (block S106). In an optional fourth step, the UE 22 executes a client application, such as, for example, the client application 92, associated with the host application 50 executed by the host computer 24 (block S108).

FIG. 4 is a flowchart illustrating an exemplary method implemented in a communication system, such as, for example, the communication system of FIG. 1, in accordance with one embodiment. The communication system may include a host computer 24, a base station 16 and a UE 22, which may be those described with reference to FIGS. 1 and 2. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the UE 22 (block S112). The transmission may pass via the base station 16, in accordance with the teachings of the embodiments described throughout this disclosure. In an optional third step, the UE 22 receives the user data carried in the transmission (block S114).

Figures 5, 6:
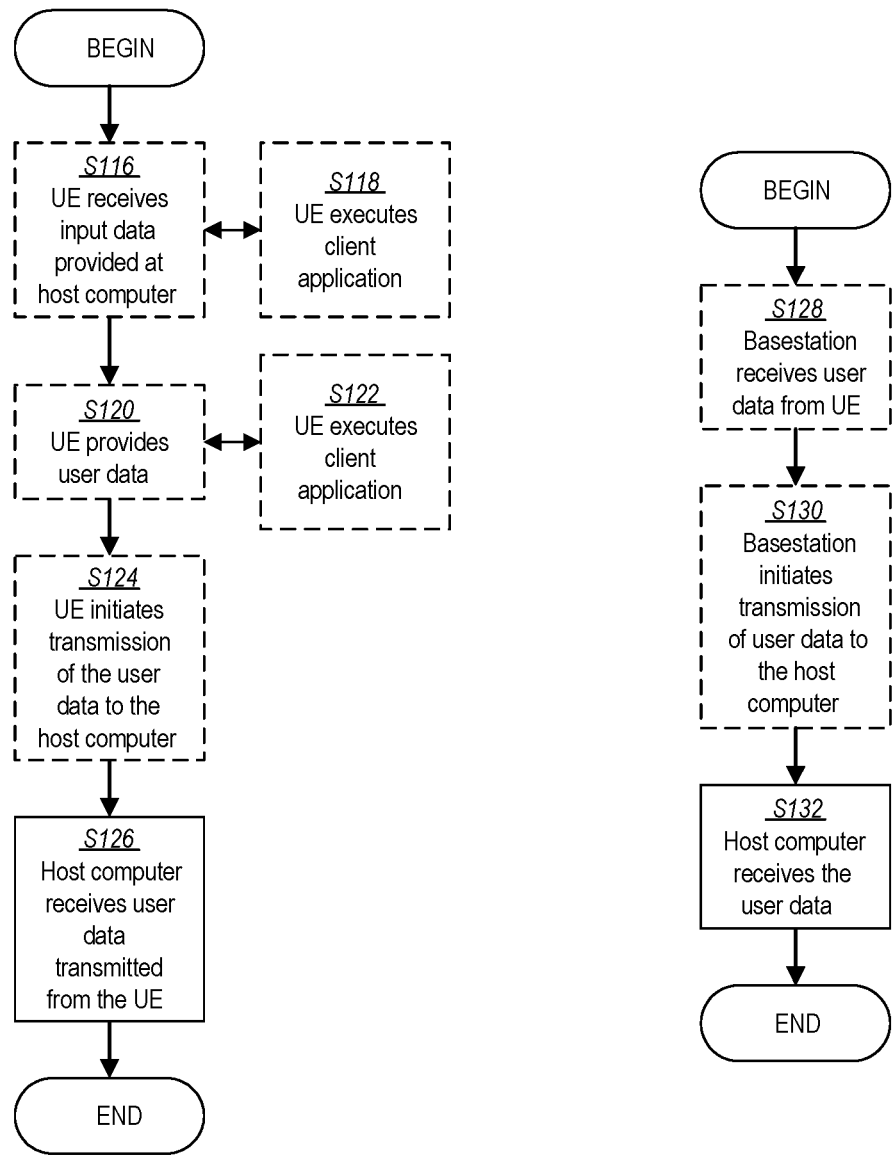
FIG. 5 is a flowchart illustrating exemplary methods implemented in a communication system including a host computer, a base station and a user equipment for receiving user data from the user equipment at a host computer according to some embodiments of the present disclosure.
FIG. 6 is a flowchart illustrating exemplary methods implemented in a communication system including a host computer, a base station and a user equipment for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a base station 16 and a UE 22, which may be those described with reference to FIGS. 1 and 2. In an optional first step of the method, the UE 22 receives input data provided by the host computer 24 (block S116). In an optional substep of the first step, the UE 22 executes the client application 92, which provides the user data in reaction to the received input data provided by the host computer 24 (block S118). Additionally or alternatively, in an optional second step, the UE 22 provides user data (block S120). In an optional substep of the second step, the UE provides the user data by executing a client application, such as, for example, client application 92 (block S122). In providing the user data, the executed client application 92 may further consider user input received from the user. Regardless of the specific manner in which the user data was provided, the UE 22 may initiate, in an optional third substep, transmission of the user data to the host computer 24 (block S124). In a fourth step of the method, the host computer 24 receives the user data transmitted from the UE 22, in accordance with the teachings of the embodiments described throughout this disclosure (block S126).

FIG. 6 is a flowchart illustrating an exemplary method implemented in a communication system, such as, for example, the communication system of FIG. 1, in accordance with one embodiment. The communication system may include a host computer 24, a base station 16 and a UE 22, which may be those described with reference to FIGS. 1 and 2. In an optional first step of the method, in accordance with the teachings of the embodiments described throughout this disclosure, the base station 16 receives user data from the UE 22 (block S128). In an optional second step, the base station 16 initiates transmission of the received user data to the host computer 24 (block S130). In a third step, the host computer 24 receives the user data carried in the transmission initiated by the base station 16 (block S132).

Figure 7:
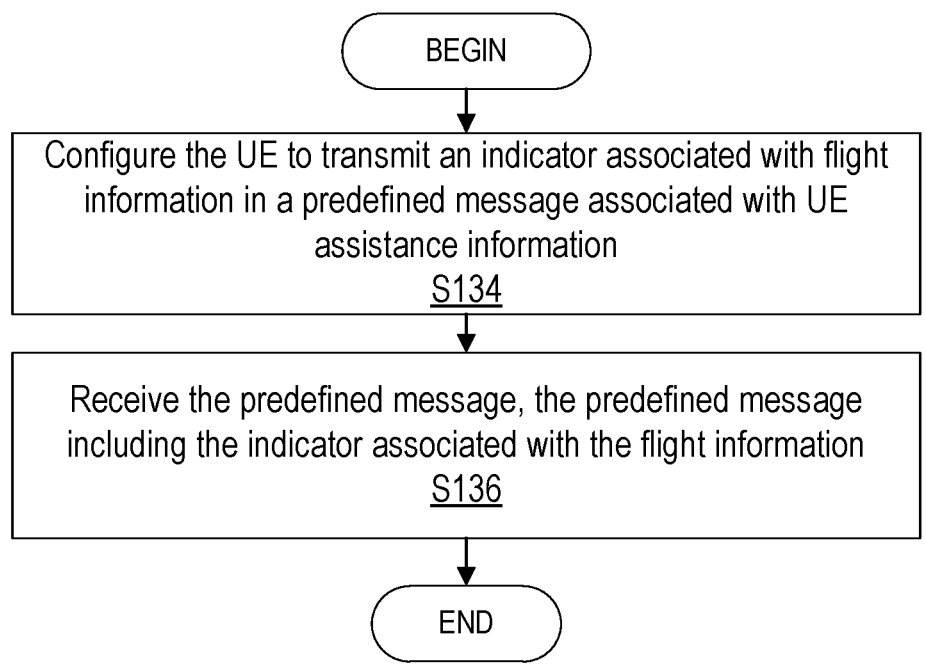
FIG. 7 is a flowchart of an exemplary process in a base station according to some embodiments of the present disclosure.

FIG. 7 is a flowchart of an exemplary process in a base station 16 for communicating and/or indicating flight information in a predefined message associated with UE assistance information. One or more Blocks and/or functions performed by base station 16 may be performed by one or more elements of base station 16 such as by information configuration unit 32 in processing circuitry 68, processor 70, radio interface 62, etc. Processing circuitry 68 is configured to configure (block S134), e.g., by instructing, the UE 22 to transmit an indicator associated with flight information in a predefined message associated with UE assistance information. Processing circuitry 68 is configured to receive (block S136) the predefined message, the predefined message including the indicator associated with the flight information.

According to some embodiments, the indicator is one of: a boolean value indicating whether the flight information is available, a boolean value indicating the flight information has been updated, a priority bit indicating whether an immediate rout of the UE 22 has changed significantly, and a bit indicating previous flight information. According to some embodiments, the indicator indicates at least one of: if the flight information has changed, if new waypoints are available and which previously indicated waypoints are valid, an updated number of waypoints available at the UE 22 and/or if the updated number of waypoints is more than the previously indicated number of waypoints, an amount of new waypoints and if some old waypoints are not valid anymore, if time stamps of some waypoints have changed, if an updated waypoint is available which deviates from a corresponding previously indicated waypoint by a predefined threshold, and an update to a time stamp of a waypoint is available which deviates from a corresponding previously indicated time stamp of the waypoint by a predefined threshold. According to one or more embodiments, an existing IE such as a UE assistance information IE is modified to include updated flight path information and/or other information described herein. As used herein, flight information includes flight path information and/or flight path plan information, among other information associated with UE flight, travel and/or movement, as described herein.

Figure 8:
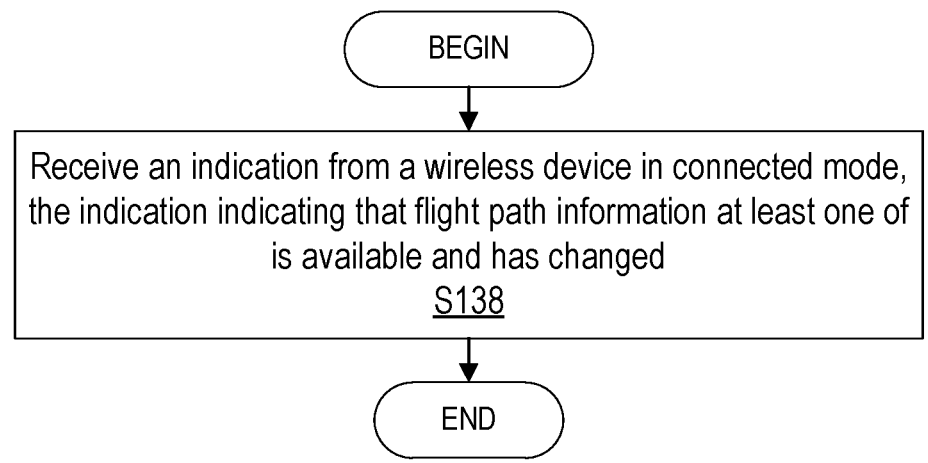
FIG. 8 is a flowchart of another exemplary process in a base station according to some embodiments of the present disclosure.

FIG. 8 is a flowchart of an exemplary process in a base station 16 according to the principles of the present disclosure. One or more Blocks and/or functions performed by base station 16 may be performed by one or more elements of base station 16 such as by information configuration unit 32 in processing circuitry 68, processor 70, radio interface 62, etc. In one or more embodiments, base station 16 such as via one or more of processing circuitry 68, processor 70, communication interface 60 and radio interface 62 is configured to receive (block S138) an indication from a UE 22 in connected mode where the indication indicating that flight path information at least one of is available and has changed.

According to one or more embodiments, the indication is included in an information element (IE) configured to provide assistance information, the assistance information being associated with at least one of power preference indications, bandwidth preference information, semi-persistent scheduling (SPS) information, radio link monitoring (RLM) events, delay budget report and overheating assistance information. According to one or more embodiments, the indication indicates waypoint information associated with a flight plan.

According to one or more embodiments, the waypoint information indicates at least one of: if new waypoints are available; which previously indicated waypoints are valid; an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments, connected mode corresponds to radio resource control (RRC) connected mode.

Figure 9:
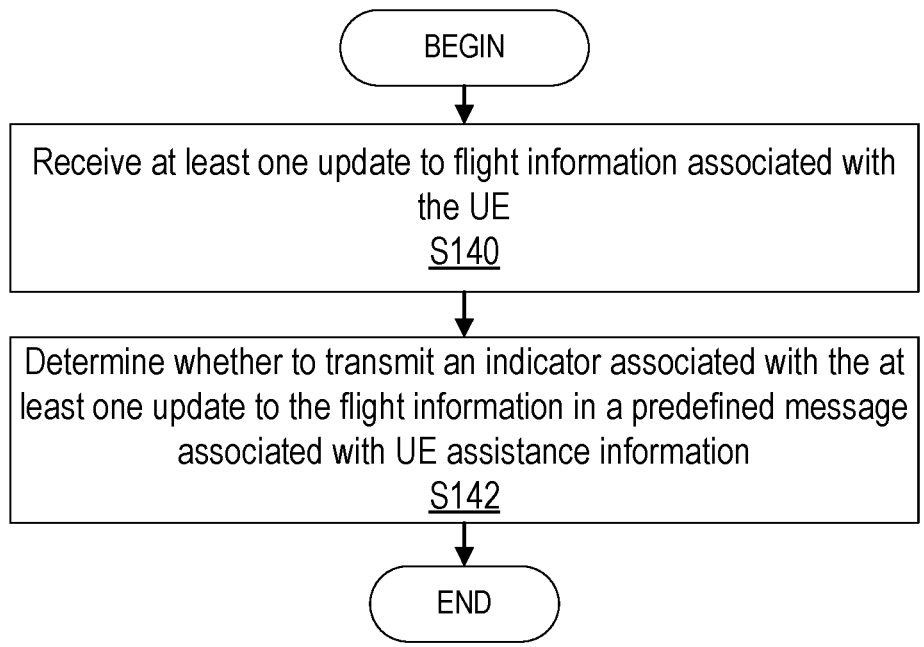
FIG. 9 is a flowchart of an exemplary process in a user equipment according to some embodiments of the present disclosure.

FIG. 9 is a flowchart of an exemplary process in a user equipment 22 for communicating and/or indicating flight information in a predefined message associated with UE assistance information. Processing circuitry 84 is configured to receive (block S140) at least one update to flight information associated with the UE 22. Processing circuitry 84 is configured to determine (block S142) whether to transmit an indicator associated with the at least one update to the flight information in a predefined message associated with UE assistance information.

According to some embodiments, the indicator is one of: a boolean value indicating whether the flight information is available, a boolean value indicating the flight information has been updated, a priority bit indicating whether an immediate rout of the UE 22 has changed significantly, and a bit indicating previous flight information. According to some embodiments, the indicator indicates at least one of: if the flight information has changed, if new waypoints are available and which previously indicated waypoints are valid, an updated number of waypoints available at the UE 22 and/or if the updated number of waypoints is more than the previously indicated number of waypoints, an amount of new waypoints and if some old waypoints are not valid anymore, if time stamps of some waypoints have changed, if an updated waypoint is available which deviates from a corresponding previously indicated waypoint by a predefined threshold, and an update to a time stamp of a waypoint is available which deviates from a corresponding previously indicated time stamp of the waypoint by a predefined threshold. According to one or more embodiments, an existing IE such as a UE assistance information IE is modified to include updated flight path information and/or other information described herein. As used herein, flight information includes flight path information and/or flight path plan information, among other information associated with UE flight, travel and/or movement, as described herein.

Figure 10:
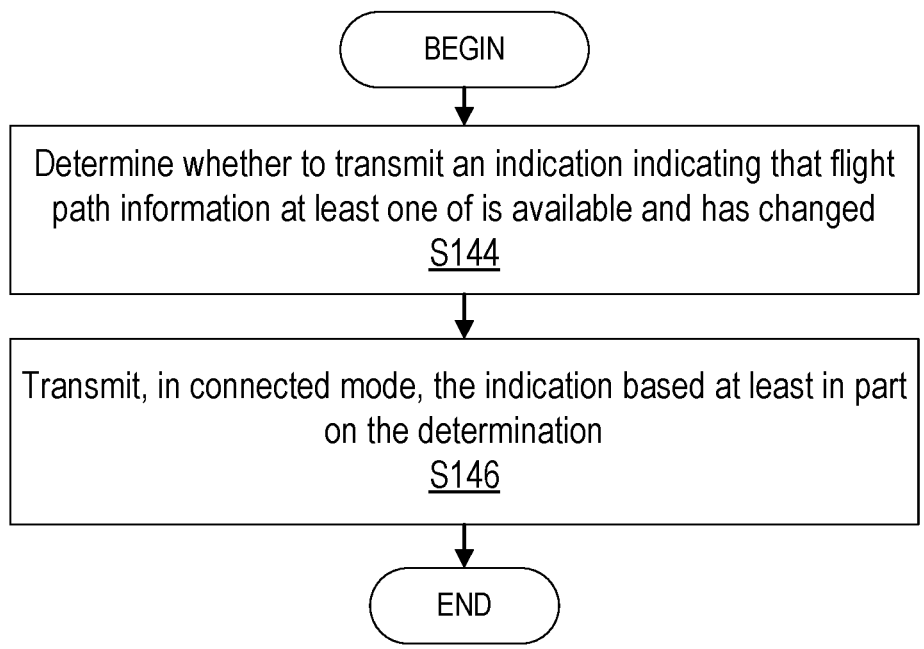
FIG. 10 is a flowchart of another exemplary process in a user equipment for communicating and/or indicating flight information according to some embodiments of the present disclosure.

FIG. 10 is a flowchart of an exemplary process in a user equipment 22 according to the principles of the present disclosure. One or more Blocks and/or functions performed by UE 22 may be performed by one or more elements of UE 22 such as by flight information unit 34 in processing circuitry 84, processor 86, radio interface 82, etc. In one or more embodiments, UE 22 such as via one or more of processing circuitry 84, processor 86 and radio interface 82 is configured to determine (block S144) whether to transmit an indication indicating that flight path information at least one of is available and has changed. In one or more embodiments, UE 22 such as via one or more of processing circuitry 84, processor 86 and radio interface 82 is configured to transmit (block S146), in connected mode, the indication based at least in part on the determination.

According to one or more embodiments, the indication is included in an information element (IE) configured to provide assistance information, the assistance information being associated with at least one of power preference indications, bandwidth preference information, semi-persistent scheduling (SPS) information, radio link monitoring (RLM) events, delay budget report and overheating assistance information. According to one or more embodiments, the indication indicates waypoint information associated with the flight plan information. According to one or more embodiments, the determination whether to transmit the indication is based at least in part on whether an update to the flight path information is received from an application layer.

According to one or more embodiments, the waypoint information indicates at least one of: if new waypoints are available; which previously indicated waypoints are valid; an updated number of waypoints; if an updated number of waypoints is more than the previously indicated number of waypoints; a quantity of new waypoints; if time stamps of some waypoints have changed; if an updated waypoint is available which deviates from a corresponding previously indicated waypoint by a predefined threshold; and an update to a time stamp of a waypoint is available which deviates from a corresponding previously indicated time stamp of the waypoint by a predefined threshold. According to one or more embodiments, connected mode corresponds to radio resource control (RRC) connected mode.

Having generally described arrangements for communicating and/or indicating flight information in a predefined message associated with UE assistance information, details for these arrangements, functions and processes are provided as follows, and which may be implemented by the base station 16, user equipment 22 and/or host computer 24. Further, as described below, embodiments allow for providing flight information in a predefined message associated with UE assistance information such that flight information may be provided one or more instances associated with messages such as RRC Reconfiguration Complete message, RRC setup complete message, RRC reestablishment complete message and RRC resume compete message, among possibly other RRC messages, thereby not relying on one specific instance or message such as a RRC connection reconfiguration complete message for communicating or indicating flight information. As used herein, flight information includes flight path information and/or flight path plan information, among other information associated with UE flight, travel and/or movement, as described herein.

In some wireless communication standards such as 3GPP TS 36.331 v 15.1.0 standard there is described an information element (IE) called UE assistance info (IE UEAssistanceInformation) with which a UE 22 can indicate to the base station, in a semi-controlled way, different aspects like an overheating problem of the UE 22 as may be specified in some wireless communication standards such as 3GPP TS 36.331 v 15.1.0—Section 5.6.10 UE Assistance Information.

Some embodiments described herein advantageously include flight information such as flight path information and/or flight path plan information of the UE 22 in this UE assistance info IE (i.e., an existing IE such as the UE assistance information IE is modified as described herein). Different embodiments for the various types of indication (indicators) and/or flight path information that may be included, i.e., embodiments on what to include in a new IE "flightPathInformationUpdate" within IE UEAssistanceInformation, are as follows:

Embodiment A

In this embodiment, a Boolean value indicating that flight path information is either available or has been updated can be included in the new IE "flightPathInformationUpdate", i.e., modified IE. In case the Boolean value is for availability, the values mean available/not available. In case the Boolean value is for update, the values may correspond to updated/not updated. The IE may include both Boolean values or have two bits for this indication.

Embodiment B

In this embodiment, an indicator for indicating if the whole flight path plan has changed can be included in the new IE "flightPathInformationUpdate", i.e., modified IE.

Furthermore, another indicator can be included in the new IE "flightPathInformationUpdate" for indicating if new waypoints are available and which previously indicated waypoints are valid. Alternatively, this indicator can indicate which previously indicated waypoints are not valid anymore and additionally indicate that the new waypoints that are available.

Furthermore, an indicator may be included in the new IE "flightPathInformationUpdate" that can indicate the updated number of waypoints available at the UE 22 (i.e., as part of the updated flight path information) and/or an indicator indicating if the updated number of waypoints is more than the previously indicated number of waypoints.

An indicator may be included in the new IE "flightPathInformationUpdate" that can indicate if time stamps of some waypoints have changed can also be included in the new IE "flightPathInformationUpdate".

In one variant of this embodiment, an indicator may be included in the new IE "flightPathInformationUpdate" that can indicate if only the time stamps of some or all of the waypoints have changed while the waypoints themselves have not changed. This may be useful in a scenario where a drone or moving UE 22 travels along a planned path but the flight of the drone may be delayed due to unexpected circumstances.

Embodiment C

In this embodiment, an indicator can be included in the new/modified IE "flightPathInformationUpdate" to indicate if an updated waypoint is available that deviates from the corresponding previously indicated waypoint by a predefined threshold. The predefined threshold can be configured to the UE 22 by the base station or network. This indicator may be useful in case the flight path of the UE 22 is changed where the base station can control how much of a deviation in flight path (i.e., deviation in updated waypoint with respect to the already indicated waypoint) is significant enough for the UE 22 to indicate the updated waypoint(s). In some embodiments, the predefined threshold can be defined in terms of 3-dimensional distance.

In this embodiment, an indicator can be included in the new IE "flightPathInformationUpdate" to indicate if an update to a time stamp of a waypoint is available that deviates from the corresponding previously indicated time stamp of the waypoint by a predefined threshold. The predefined threshold can be configured to the UE 22 by the base station. This indicator may be useful in case the flight of the UE 22 is delayed where the base station can control how much of a delay in flight (i.e., deviation in updated time stamp of a waypoint with respect to the already indicated time stamp of the waypoint) is significant enough for the UE 22 to indicate the updated time stamp of the waypoint.

Embodiment D

In this embodiment, a priority bit can be included in the new/modified IE "flightPathInformationUpdate" that can indicate if the immediate route of the UE 22 has changed significantly.

Embodiment E

In this embodiment, one bit is added to the new/modified IE "flightPathInformationUpdate" that can indicate invalidation of the previous flight path information.

In another embodiment, a prohibit timer is started at UE 22 after "flightPathInformationUpdate" is sent. When the timer is running, the UE 22 may be prohibited from sending "flightPathInformationUpdate". The value of the prohibit timer may be configured by the base station. In another example, the timer can also be configured when UE 22 is allowed (by configuration) to send the flight path autonomously.

In addition, the FlightPathInformationUpdate may be included in another complete message than the RRCReconfigurationComplete message. It may be added to an RRCSetupcomplete message, RRCReestablishementComplete message and/or RRCResumeComplete message.

Example changes to the 3GPP TS 36.331 v 15.1.0 standard for an embodiment which previously reported waypoints are valid and if the new waypoints timers are available may be as follows:

Section 5.6.10.3 Actions Related to Transmission of UEAssistanceInformation Message The UE 22 may set the contents of the UEAssistanceInformation message for power preference indications:

1> if configured to provide power preference indication and if the UE 22 prefers a configuration primarily optimized for power saving:

2> set powerPrefIndication to lowPowerConsumption;

1> else if configured to provide power preference indication:

2> start or restart timer T340 with the timer value set to the powerPrefIndicationTimer;

2> set powerPrefIndication to normal;

The UE 22 may set the contents of the UEAssistanceInformation message for SPS assistance information:

1> if configured to provide SPS assistance information:

2> if there is any traffic for V2X sidelink communication which needs to report SPS assistance information:

3> include trafficPatternInfoListSL in the UEAssistanceInformation message;

2> if there is any traffic for uplink communication which needs to report SPS assistance information:

3> include trafficPatternInfoListUL in the UEAssistanceInformation message;

The UE 22 may set the contents of the UEAssistanceInformation message for bandwidth preference indications:

1> start timer T341 with the timer value set to the bw-PreferenceIndicationTimer;

1> set bw-Preference to its preferred configuration;

The UE 22 may set the contents of the UEAssistanceInformation message for delay budget report:

1> if configured to provide delay budget report:

2> if the UE 22 prefers an adjustment in the connected mode DRX cycle length:

3> set delayBudgetReport to type1 according to a desired value;

2> else if the UE 22 prefers coverage enhancement configuration change:

3> set delayBudgetReport to type2 according to a desired value;

2> start or restart timer T342 with the timer value set to the delayBudgetReportingProhibitTimer;

The UE 22 may set the contents of the UEAssistanceInformation message for the RLM report:
1> if T314 has expired:
  2> set rlm-event to earlyOutOfSync;
  2> start timer T343 with the timer value set to the rlmReportTimer:
1> if T315 has expired:
  2> set rlm-event to earlyInSync;
  2> start timer T344 with the timer value set to the rlmReportTimer:
  2> if configured to report rlmReportRep-MPDCCH:
    3> set excessRep-MPDCCH to the value indicated by lower layers;

The UE 22 may set the contents of the UEAssistanceInformation message for overheating assistance indication:
1> if the UE 22 experiences internal overheating:
  2> if the UE 22 prefers to temporarily reduce its DL category and UL category:
    3> include reducedUE-Category in the OverheatingAssistance IE;
    3> set reducedUE-CategoryDL to the number to which the UE 22 prefers to temporarily reduce its DL category;
    3> set reducedUE-CategoryUL to the number to which the UE 22 prefers to temporarily reduce its UL category;
  2> if the UE 22 prefers to temporarily reduce the number of maximum secondary component carriers:
    3> include reducedMaxCCs in the OverheatingAssistance IE;
    3> set reducedCCsDL to the number of maximum SCells the UE 22 prefers to be temporarily configured in downlink;
    3> set reducedCCsUL to the number of maximum SCells the UE 22 prefers to be temporarily configured in uplink;
  2> start timer T345 with the timer value set to the overheatingIndicationProhibitTimer;
1> else (if the UE 22 no longer experiences an overheating condition):
  2> do not include reducedUE-Category and reducedMaxCCs in OverheatingAssistance IE;
  2> start timer T345 with the timer value set to the overheatingIndicationProhibitTimer;

The UE 22 may set the contents of the UEAssistanceInformation message for flight path information assistance indication:
1> if configured to provide flight path information assistance information:
  2> if the UE 22 receives update to flight path information from application layer:
    3> include flightPathInformationUpdate in the UEAssistanceInformation message;

The UE 22 may submit the UEAssistanceInformation message to lower layers for transmission.

NOTE 1: It is up to UE 22 implementation when and how to trigger SPS assistance information.

NOTE 2: It is up to UE 22 implementation to set the content of trafficPatternInfoListSL and trafficPatternInfoListUL.

NOTE 3: Traffic patterns for different Destination Layer 2 IDs are provided in different entries in trafficPatternInfoListSL.

Another Change
UEAssistanceInformation
The UEAssistanceInformation message may be used for the indication of UE assistance information to the base station, i.e., the existing UE assistance information IE may be modified to include an indication and/or other information described herein.
Signalling radio bearer: SRB1
RLC-SAP: AM
Logical channel: DCCH
Direction: UE 22 to E-UTRAN A user equipment 22 that "prefers" to perform an action may correspond to a UE 22 being preconfigured to perform the action or the UE 22 making a determination to perform the action based on some criterion.
UEAssistanceInformation message code

```
-- ASN1START
UEAssistanceInformation-r11 ::=         SEQUENCE {
  criticalExtensions                      CHOICE {
    c1                                      CHOICE {
      ueAssistanceInformation-r11             UEAssistanceInformation-r11-IEs,
      spare3 NULL, spare2 NULL, spare 1 NULL
    },
    criticalExtensionsFuture                SEQUENCE { }
  }
}
UEAssistanceInformation-r11-IEs ::=     SEQUENCE {
  powerPrefIndication-r11                 ENUMERATED {normal,
lowPowerConsumption}                    OPTIONAL,
  lateNonCriticalExtension                OCTET STRING
    OPTIONAL,
  nonCriticalExtension                    UEAssistanceInformation-v1430-IEs
    OPTIONAL
}
UEAssistanceInformation-v1430-IEs ::=    SEQUENCE {
  bw-Preference-r14                       BW-Preference-r14
    OPTIONAL,
  sps-AssistanceInformation-r14           SEQUENCE {
    trafficPatternInfoListSL-r14            TrafficPatternInfoList-r14
OPTIONAL,
    trafficPatternInfoListUL-r14            TrafficPatternInfoList-r14
OPTIONAL
  } OPTIONAL,
  rlm-Report-r14                          SEQUENCE {
    rlm-Event-r14                           ENUMERATED {early OutOfSync,
```

```
earlyInSync},
   excessRep-MPDCCH-r14                  ENUMERATED {excessRep1,
excessRep2} OPTIONAL
 }
 OPTIONAL, delayBudgetReport-r14         DelayBudgetReport-r14
     OPTIONAL,
 nonCriticalExtension                    UEAssistanceInformation-v1450-IEs
 OPTIONAL
}
UEAssistanceInformation-v1450-IEs ::=    SEQUENCE {
 overheatingAssistance-r14               OverheatingAssistance-r14
 OPTIONAL,
 nonCriticalExtension                    UEAssistanceInformation-v16xy-IEs
     OPTIONAL
}
UEAssistanceInformation-v16xy-IEs ::=    SEQUENCE {
 flightPathInformationUpdate-r16         FlightPathInformationUpdate-r16
 OPTIONAL,
 nonCriticalExtension                    SEQUENCE { }      OPTIONAL
}
BW-Preference-r14 ::= SEQUENCE {
 dl-Preference-r14                       ENUMERATED
{mhz1dot4, mhz5, mhz20 }
    OPTIONAL,
 ul-Preference-r14                       ENUMERATED {mhz1dot4, mhz5}
 OPTIONAL
}
TrafficPatternInfoList-r14 ::= SEQUENCE (SIZE (1..maxTrafficPattern-
r14)) OF
TrafficPatternInfo-r14
TrafficPatternInfo-r14 ::= SEQUENCE {
 trafficPeriodicity-r14                  ENUMERATED {
                                            sf20, sf50, sf100,
sf200, sf300, sf400, sf500,
                                            sf600, sf700,
sf800, sf900, sf1000},
 timingOffset-r14                        INTEGER (0..10239),
 priorityInfoSL-r14                      SL-Priority-r13
 OPTIONAL,
 logicalChannelIdentityUL-r14            INTEGER (3..10)
 OPTIONAL,
 messageSize-r14                         BIT STRING (SIZE (6))
}
DelayBudgetReport-r14::= CHOICE {
 type1                                   ENUMERATED {
                                           msMinus1280,
msMinus640, msMinus320, msMinus160,
                                           msMinus80, msMinus60,
msMinus40, msMinus20, ms0, ms20,           ms40, ms60,
ms80, ms160, ms320, ms640, ms1280},
 type2                                   ENUMERATED {
                                           msMinus192, msMinus168,
msMinus144, msMinus120,
                                           msMinus96, msMinus72,
msMinus48, msMinus24, ms0, ms24,           ms48, ms72,
ms96, ms120, ms144, ms168, ms192}
}
OverheatingAssistance-r14 ::=   SEQUENCE {
   reducedUE-Category                    SEQUENCE {
    reducedUE-CategoryDL                   INTEGER (0..19),
    reducedUE-CategoryUL                   INTEGER (0..21)
   } OPTIONAL,
   reducedMaxCCs                         SEQUENCE {
    reducedCCsDL                           INTEGER (0..31),
    reducedCCsUL                           INTEGER (0..31)
   } OPTIONAL
}
FlightPathInformationUpdate-r16 ::= SEQUENCE {
newWaypoints                             INTEGER (0..19) OPTIONAL,
oldWayPointsValid                        BOOLEAN OPTIONAL,
oldTimeStamsValid                        BOOLEAN OPTIONAL
}
-- ASN1STOP
```

| UEAssistanceInformation field descriptions |
| --- |
| delayBudgetReport |
| Indicates the UE-preferred adjustment to connected mode Discontinuous Reception (DRX) or coverage enhancement configuration.| |
| dl-Preference |
| Indicates UE 22's preference on configuration of maximum Physical Downlink Shared Channel (PDSCH) bandwidth. The value mhz1dot4 corresponds to Coverage Enchancement (CE) mode usage in 1.4 MHz bandwidth, mhz5 corresponds to CE mode usage in 5 MHz bandwidth, and mhz20 corresponds to CE mode usage in 20 MHz bandwidth or normal coverage. |
| excessRep-MPDCCH |
| Indicates the excess number of repetitions on MPDCCH. Value excessRep1 and excessRep2 indicate the excess number of repetitions defined in 3GPP TS 36.133 v 15.1.0 standard. |
| logicalChannelIdentityUL |
| Indicates the logical channel identity associated with the reported traffic pattern in the uplink logical channel. |
| messageSize |
| Indicates the maximum TB size based on the observed traffic pattern. The value refers to the index of 3GPP TS 36.133 v 15.1.0 standard. |
| powerPrefIndication |
| Value lowPowerConsumption indicates the UE 22 prefers a configuration that is primarily optimised for power saving. Otherwise the value is set to normal. |
| priorityInfoSL |
| Indicates the traffic priority (i.e., PPPP) associated with the reported traffic pattern for V2X sidelink communication. |
| reducedCCsDL |
| Indicates the UE 22's preference on reduced configuration corresponding to the maximum number of downlink SCells indicated by the field, to address overheating. |
| reducedCCsUL |
| Indicates the UE 22's preference on reduced configuration corresponding to the maximum number of uplink SCells indicated by the field, to address overheating. |
| reducedUE-CategoryDL, reducedVE-CategoryUL |
| Indicates that UE 22 prefers a configuration corresponding to the reduced UE category, to address overheating. The reduced UE DL category and reduced UE UL category should be indicated according to supported combinations for UE UL and DL Categories, see 3GPP TS 36.133 v 15.1.0 standard. |
| rlm-Event |
| This field provides the RLM event ("early-out-of-sync" or "early-in-sync"). |
| rlm-Report |
| This field provides the RLM report for BL UEs and UEs in CE. |
| sps-AssistanceInformation |
| Indicates the UE assistance information to assist E-UTRAN to configure SPS. |
| timingOffset |
| This field indicates the estimated timing for a packet arrival in a SL/UL logical channel. Specifically, the value indicates the timing offset with respect to subframe#0 of SFN#0 in milliseconds. |
| trafficPatternInfoListSL |
| This field provides the traffic characteristics of sidelink logical channel(s) that are setup for V2X sidelink communication. |

| UEAssistanceInformation field descriptions |
| --- |
| trafficPatternInfoListUL |
| This field provides the traffic characteristics of uplink logical channel(s). |
| trafficPeriodicity |
| This field indicates the estimated data arrival periodicity in a SL/UL logical channel. Value sf20 corresponds to 20 ms, sf50 corresponds to 50 ms and so on. |
| type1 |
| Indicates the preferred amount of increment/decrement to the connected mode DRX cycle length with respect to the current configuration. Value in number of milliseconds. Value ms40 corresponds to 40 milliseconds, msMinus40 corresponds to −40 milliseconds and so on. |
| type2 |
| Indicates the preferred amount of increment/decrement to the coverage enhancement configuration with respect to the current configuration so that the Uu air interface delay changes by the indicated amount. Value in number of milliseconds. Value ms24 corresponds to 24 milliseconds, msMinus24 corresponds to −24 milliseconds and so on. |
| ul-Preference |
| Indicates UE 22's preference on configuration of maximum Physical Uplink Shared Channel (PUSCH) bandwidth. The value mhz1dot4 corresponds to CE mode usage in 1.4 MHz bandwidth, and mhz5 corresponds to CE mode usage in 5 MHz bandwidth. |

Example specification changes in a wireless communications standard such as in 3GPP TS 36.331 v 15.1.0 standard for an embodiment including prohibit timer, discussed above, are indicated in bold below:

Section 5.6.10.2—Initiation

A UE 22 capable of, i.e., configured to, providing power preference indications in RRC_CONNECTED may initiate the procedure in several cases including upon being configured to provide power preference indications and upon change of power preference. A UE 22 capable of providing SPS assistance information in RRC_CONNECTED may initiate the procedure in several cases including upon being configured to provide SPS assistance information and upon change of SPS assistance information.

A UE 22 capable of providing delay budget report in RRC_CONNECTED may initiate the procedure in several cases, including upon being configured to provide delay budget report and upon change of delay budget preference.

A UE 22 capable of CE mode and providing maximum PDSCH/PUSCH bandwidth preference in RRC_CONNECTED may initiate the procedure upon being configured to provide maximum PDSCH/PUSCH bandwidth preference and/or upon change of maximum PDSCH/PUSCH bandwidth preference.

A UE 22 capable of providing overheating assistance information in RRC_CONNECTED may initiate the procedure if it was configured to do so, upon detecting internal overheating, or upon detecting that it is no longer experiencing an overheating condition.

Upon initiating the procedure, the UE 22 may:

1> if configured to provide power preference indications:

2> if the UE 22 did not transmit a UEAssistanceInformation message with powerPrefIndication since it was configured to provide power preference indications; or 2> if the current power preference is different from the one indicated in the last transmission of the UEAssistanceInformation message and timer T340 is not running:

3> initiate transmission of the UEAssistanceInformation message in accordance with section 5.6.10.3 (below);

1> if configured to provide maximum PDSCH/PUSCH bandwidth preference:

2> if the UE 22 did not transmit a UEAssistanceInformation message with bw-Preference since it was configured to provide maximum PDSCH/PUSCH bandwidth preference; or 2> if the current maximum PDSCH/PUSCH bandwidth preference is different from the one indicated in the last transmission of the UEAssistanceInformation message and timer T341 is not running;

3> initiate transmission of the UEAssistanceInformation message in accordance with section 5.6.10.3;

1> if configured to provide SPS assistance information:

2> if the UE 22 did not transmit a UEAssistanceInformation message with sps-AssistanceInformation since it was configured to provide SPS assistance information; or 2> if the current SPS assistance information is different from the one indicated in the last transmission of the UEAssistanceInformation message:

3> initiate transmission of the UEAssistanceInformation message in accordance with section 5.6.10.3;

1> if configured to report RLM events:

2> if "early-out-of-sync" event has been detected and T343 is not running; or

2> if "early-in-sync" event has been detected and T344 is not running:
   3> initiate transmission of the UEAssistanceInformation message in accordance with section 5.6.10.3;
1> if configured to provide delay budget report:
   2> if the UE 22 did not transmit a UEAssistanceInformation message with delayBudgetReport since it was configured to provide delay budget report; or
   2> if the current delay budget is different from the one indicated in the last transmission of the UEAssistanceInformation message and timer T342 is not running:
      3> initiate transmission of the UEAssistanceInformation message in accordance with section 5.6.10.3;
1> if configured to provide overheating assistance information:
   2> if the overheating condition has been detected and T345 is not running; or
   2> if the current overheating assistance information is different from the one indicated in the last transmission of the UEAssistanceInformation message and timer T345 is not running:
      3> initiate transmission of the UEAssistanceInformation message in accordance with section 5.6.10.3;
1> if configured to provide flight path plan assistance information:
   2> if the UE 22 receives update to flight path plan from application layer and timer T3xx is not running:
      3> initiate transmission of the UEAssistanceInformation message in accordance with section 5.6.10.3.

Section 5.6.10.3—Actions Related to Transmission of UEAssistanceInformation Message The UE 22 may set the contents of the UEAssistanceInformation message for power preference indications:
1> if configured to provide power preference indication and if the UE 22 prefers a configuration primarily optimised for power saving:
   2> set powerPrefIndication to lowPowerConsumption;
1> else if configured to provide power preference indication:
   2> start or restart timer T340 with the timer value set to the powerPrefIndicationTimer;
   2> set powerPrefIndication to normal;

The UE 22 may set the contents of the UEAssistanceInformation message for SPS assistance information:
1> if configured to provide SPS assistance information:
   2> if there is any traffic for V2X sidelink communication which needs to report SPS assistance information:
      3> include trafficPatternInfoListSL in the UEAssistanceInformation message;
   2> if there is any traffic for uplink communication which needs to report SPS assistance information:
      3> include trafficPatternInfoListUL in the UEAssistanceInformation message;

The UE 22 may set the contents of the UEAssistanceInformation message for bandwidth preference indications:
1> start timer T341 with the timer value set to the bw-PreferenceIndicationTimer;
1> set bw-Preference to its preferred configuration;

The UE 22 may set the contents of the UEAssistanceInformation message for delay budget report:
1> if configured to provide delay budget report:
   2> if the UE 22 prefers an adjustment in the connected mode DRX cycle length:
      3> set delayBudgetReport to type1 according to a desired value;
   2> else if the UE 22 prefers coverage enhancement configuration change:
      3> set delayBudgetReport to type2 according to a desired value;
   2> start or restart timer T342 with the timer value set to the delayBudgetReportingProhibitTimer;

The UE 22 may set the contents of the UEAssistanceInformation message for the RLM report:
1> if T314 has expired:
   2> set rlm-event to earlyOutOfSync;
   2> start timer T343 with the timer value set to the rlmReportTimer:
1> if T315 has expired:
   2> set rlm-event to earlyInSync;
   2> start timer T344 with the timer value set to the rlmReportTimer:
   2> if configured to report rlmReportRep-MPDCCH:
      3> set excessRep-MPDCCH to the value indicated by lower layers;

The UE 22 may set the contents of the UEAssistanceInformation message for overheating assistance indication:
1> if the UE 22 experiences internal overheating:
   2> if the UE 22 prefers to temporarily reduce its DL category and UL category:
      3> include reducedUE-Category in the OverheatingAssistance IE;
      3> set reducedUE-CategoryDL to the number to which the UE 22 prefers to temporarily reduce its DL category;
      3> set reducedUE-CategoryUL to the number to which the UE 22 prefers to temporarily reduce its UL category;
   2> if the UE 22 prefers to temporarily reduce the number of maximum secondary component carriers:
      3> include reducedMaxCCs in the OverheatingAssistance IE;
      3> set reducedCCsDL to the number of maximum SCells the UE 22 prefers to be temporarily configured in downlink;
      3> set reducedCCsUL to the number of maximum SCells the UE 22 prefers to be temporarily configured in uplink;
   2> start timer T345 with the timer value set to the overheatingIndicationProhibitTimer;
1> else (if the UE 22 no longer experiences an overheating condition):
   2> do not include reducedUE-Category and reducedMaxCCs in OverheatingAssistance IE;
   2> start timer T345 with the timer value set to the overheatingIndicationProhibitTimer;

The UE 22 may set the contents of the UEAssistanceInformation message for flight path information assistance indication:
1> if configured to provide flight path information assistance information:
   2> include flightPathInformationUpdate in the UEAssistanceInformation message;
   2> start timer T3xx with the timer value set to the flightPathInformationUpdateProhibitTimer;

The UE 22 may submit the UEAssistanceInformation message to lower layers for transmission.

NOTE 1: It is up to UE 22 implementation when and how to trigger SPS assistance information.

NOTE 2: It is up to UE 22 implementation to set the content of trafficPatternInfoListSL and trafficPatternInfoListUL.

NOTE 3: Traffic patterns for different Destination Layer 2 IDs are provided in different entries in trafficPatternInfoListSL.

Another Change

UEAssistanceInformation

The UEAssistanceInformation message may be used for the indication of UE assistance information to the base station.

Signalling radio bearer: SRB1
RLC-SAP: AM
Logical channel: DCCH
Direction: UE 22 to E-UTRAN
UEAssistanceInformation message

```
-- ASN1START
UEAssistanceInformation-r11 ::=      SEQUENCE {
  criticalExtensions                 CHOICE {
    c1                               CHOICE {
      ueAssistanceInformation-r11    UEAssistanceInformation-r11-IEs,
      spare3 NULL, spare2 NULL, spare1 NULL
    },
    criticalExtensionsFuture         SEQUENCE {}
  }
}
UEAssistanceInformation-r11-IEs ::= SEQUENCE {
  powerPrefIndication-r11            ENUMERATED {normal,
lowPowerConsumption}                 OPTIONAL,
  lateNonCriticalExtension           OCTET STRING
    OPTIONAL,
  nonCriticalExtension               UEAssistanceInformation-v1430-IEs
  OPTIONAL
}
UEAssistanceInformation-v1430-IEs ::= SEQUENCE {
  bw-Preference-r14                  BW-Preference-r14
    OPTIONAL,
  sps-AssistanceInformation-r14      SEQUENCE {
    trafficPatternInfoListSL-r14     TrafficPatternInfoList-r14
  OPTIONAL,
    trafficPatternInfoListUL-r14     TrafficPatternInfoList-r14
  OPTIONAL
  } OPTIONAL,
  rlm-Report-r14                     SEQUENCE {
    rlm-Event-r14                    ENUMERATED {earlyOutOfSync,
earlyInSync},
    excessRep-MPDCCH-r14             ENUMERATED {excessRep1,
excessRep2}                          OPTIONAL
  }
  OPTIONAL, delayBudgetReport-       DelayBudgetReport-r14
r14
      OPTIONAL,
  nonCriticalExtension               UEAssistanceInformation-v1450-IEs
  OPTIONAL
}
UEAssistanceInformation-v1450-IEs ::= SEQUENCE {
  overheatingAssistance-r14          OverheatingAssistance-r14
  OPTIONAL,
  nonCriticalExtension               UEAssistanceInformation-v16xy-IEs
  OPTIONAL
}
UEAssistanceInformation-v16xy-IEs ::= SEQUENCE {
  flightPathInformationUpdate-       FlightPathInformationUpdate-r16
r16
  OPTIONAL,
  nonCriticalExtension               SEQUENCE {} OPTIONAL
}
BW-Preference-r14 ::= SEQUENCE {
  dl-Preference-r14                  ENUMERATED {mhz1dot4, mhz5, mhz20 }
    OPTIONAL,
  ul-Preference-r14                  ENUMERATED {mhz1dot4, mhz5}
  OPTIONAL
}
TrafficPatternInfoList-r14 ::= SEQUENCE (SIZE (1..maxTrafficPattern-r14)) OF
TrafficPatternInfo-r14
TrafficPatternInfo-r14 ::= SEQUENCE {
  trafficPeriodicity-r14             ENUMERATED {
                                       sf20, sf50, sf100, sf200, sf300, sf400,
sf500,
                                       sf600, sf700, sf800, sf900, sf1000},
  timingOffset-r14                   INTEGER (0..10239),
  priorityInfoSL-r14                 SL-Priority-r13
  OPTIONAL,
  logicalChannelIdentityUL-r14       INTEGER (3..10)
  OPTIONAL,
```

```
 messageSize-r14                    BIT STRING (SIZE (6))
}
DelayBudgetReport-r14::= CHOICE {
 type1                              ENUMERATED {
                                    msMinus1280, msMinus640, msMinus320,
msMinus160,
                                    msMinus80, msMinus60, msMinus40,
msMinus20, ms0, ms20,                ms40, ms60,
ms80, ms160, ms320, ms640, ms1280},
 type2                              ENUMERATED {
                                    msMinus192, msMinus168,msMinus144,
msMinus120,
                                    msMinus96, msMinus72, msMinus48,
msMinus24, ms0, ms24,                ms48, ms72,
ms96, ms120, ms144, ms168, ms192}
}
OverheatingAssistance-r14 ::= SEQUENCE {
    reducedUE-Category              SEQUENCE {
    reducedUE-CategoryDL                INTEGER (0..19),
    reducedUE-CategoryUL                INTEGER (0..21)
    } OPTIONAL,
    reducedMaxCCs                   SEQUENCE {
    reducedCCsDL                        INTEGER (0..31),
    reducedCCsUL                        INTEGER (0..31)
    } OPTIONAL
}
FlightPathInformationUpdate-r16 ::= SEQUENCE {
newWaypoints                        INTEGER (0..19) OPTIONAL,
timeStampsAvailable                 BOOLEAN OPTIONAL,
oldWayPointsValid                   BOOLEAN OPTIONAL,
oldTimeStamsValid                   BOOLEAN OPTIONAL
}
-- ASN1STOP
```

| UEAssistanceInformation field descriptions |
| --- |
| delayBudgetReport |
| Indicates the UE-preferred adjustment to connected mode DRX or coverage enhancement configuration. |
| dl-Preference |
| Indicates UE 22's preference on configuration of maximum PDSCH bandwidth. The value mhz1dot4 corresponds to CE mode usage in 1.4 MHz bandwidth, mhz 5 corresponds to CE mode usage in 5 MHz bandwidth, and mhz20 corresponds to CE mode usage in 20 MHz bandwidth or normal coverage. |
| excessRep-MPDCCH Indicates the excess number of repetitions on MPDCCH. Value excessRep1 and excessRep2 indicate the excess number of repetitions defined in 3GPP TS 36.133 v 15.1.0. |
| logicalChannelIdentityUL |
| Indicates the logical channel identity associated with the reported traffic pattern in the uplink logical channel. |
| messageSize |
| Indicates the maximum TB size based on the observed traffic pattern. The value refers to the index of 3GPP TS 36.321 v 15.1.0, table 6.1.3.1-1. |
| powerPrefIndication |
| Value lowPowerConsumption indicates the UE 22 prefers a configuration that is primarily optimized for power saving. Otherwise the value is set to normal. |
| priorityInfoSL |
| Indicates the traffic priority (i.e., PPPP) associated with the reported traffic pattern for V2X sidelink communication. |
| reducedCCsDL |

-continued

| UEAssistanceInformation field descriptions |
|---|

Indicates the UE 22's preference on reduced configuration corresponding to the maximum number of downlink SCells indicated by the field, to address overheating.

reducedCCsUL

Indicates the UE 22's preference on reduced configuration corresponding to the maximum number of uplink SCells indicated by the field, to address overheating.

reducedUE-CategoryDL, reducedUE-CategoryUL

Indicates that UE 22 prefers a configuration corresponding to the reduced UE category, to address overheating. The reduced UE DL category and reduced UE UL category should be indicated according to supported combinations for UE UL and DL Categories, see 3GPP TS 36.306 v 15.1.0, Table 4.1A-6.

rlm-Event

This field provides the RLM event ("early-out-of-sync" or "early-in-sync").

rlm-Report

This field provides the RLM report for BL UEs and UEs in CE.

sps-AssistanceInformation

Indicates the UE assistance information to assist E-UTRAN to configure SPS.

timingOffset

This field indicates the estimated timing for a packet arrival in a SL/UL logical channel. Specifically, the value indicates the timing offset with respect to subframe#0 of SFN#0 in milliseconds.

trafficPatternInfoListSL

This field provides the traffic characteristics of sidelink logical channel(s) that are setup for V2X sidelink communication.

trafficPatternInfoListUL

This field provides the traffic characteristics of uplink logical channel(s).

trafficPeriodicity

This field indicates the estimated data arrival periodicity in a SL/UL logical channel. Value sf20 corresponds to 20 ms, sf50 corresponds to 50 ms and so on.

type1

Indicates the preferred amount of increment/decrement to the connected mode DRX cycle length with respect to the current configuration. Value in number of milliseconds. Value ms40 corresponds to 40 milliseconds, msMinus40 corresponds to −40 milliseconds and so on.

type2

Indicates the preferred amount of increment/decrement to the coverage enhancement configuration with respect to the current configuration so that the Uu air interface delay changes by the indicated amount. Value in number of milliseconds. Value ms24 corresponds to 24 milliseconds, msMinus24 corresponds to −24 milliseconds and so on.

ul-Preference

Indicates UE's preference on configuration of maximum PUSCH bandwidth. The value mhz1dot4 corresponds to CE mode usage in 1.4 MHz bandwidth, and mhz5 corresponds to CE mode usage in 5 MHz bandwidth.

Another Change
OtherConfig
The IE OtherConfig contains configuration related to other configuration
OtherConfig Information Element

```
-- ASN1START
OtherConfig-r9 ::= SEQUENCE {
 reportProximityConfig-r9                    ReportProximityConfig-r9 OPTIONAL,
 -- Need ON
 ...,
 [[ idc-Config-r11                           IDC-Config-r11
 OPTIONAL, -- Need ON
  powerPrefIndicationConfig-r11 PowerPrefIndicationConfig-r11 OPTIONAL,
 -- Need ON
  obtainLocationConfig-r11                   ObtainLocationConfig-r11 OPTIONAL
 -- Need ON
 ]],
 [[ bw-PreferenceIndicationTimer-r14                         ENUMERATED {s0,
s0dot5, s1, s2, s5, s10, s20,
                                              s30, s60, s90, s120, s300, s600, spare3,
                                              spare2, spare1} OPTIONAL, --
Need OR
  sps-AssistanceInfoReport-r14               BOOLEAN OPTIONAL, --
Need ON
   delayBudgetReportingConfig-r14            CHOICE{
    release                                  NULL,
    setup                                    SEQUENCE{
     delayBudgetReportingProhibitTimer-r14                   ENUMERATED {
                                                              s0, s0dot4, s0dot8,
                                                              s1dot6, s3, s6, s12,
s30}
    }
   }                                                         OPTIONAL,
   -- Need ON
   rlm-ReportConfig-r14                      CHOICE {
    release                                  NULL,
    setup                                    SEQUENCE{
     rlmReportTimer-r14                                      ENUMERATED {s0,
s0dot5, s1, s2, s5, s10, s20, s30,
                                                              s60, s90, s120,
s300, s600, spare3, spare2, spare1},
     rlmReportRep-MPDCCH-r14                                 ENUMERATED {setup}
   OPTIONAL -- Need OR
    }
   } OPTIONAL -- Need ON
 ]],
 [[ overheatingAssistanceConfig-r14          CHOICE{
    release                                  NULL,
    setup                                    SEQUENCE{
     overheatingIndicationProhibitTimer-r14                  ENUMERATED {s0,
s0dot5, s1, s2, s5, s10,
                                                              s20, s30, s60, s90,
s120, s300, s600,
                                                              spare3, spare2, spare1}
    }
 } OPTIONAL -- Need ON
 ]]
}
IDC-Config-r11 ::=                           SEQUENCE {
 idc-Indication-r11                          ENUMERATED {setup}
 OPTIONAL, -- Need OR
 autonomousDenialParameters-r11              SEQUENCE {
   autonomousDenialSubframes-r11             ENUMERATED {n2, n5,
n10, n15,
                                              n20, n30, spare2, spare1},
   autonomousDenialValidity-r11              ENUMERATED {
                                              sf200, sf500,
sf1000, sf2000,                               spare4, spare3, spare2,
spare1}
 } OPTIONAL, -- Need OR
 ...,
 [[ idc-Indication-UL-CA-r11                 ENUMERATED {setup}
 OPTIONAL -- Cond idc-Ind
 ]],
 [[ idc-HardwareSharingIndication-r13ENUMERATED {setup}
 OPTIONAL -- Need OR
 ]]
}
ObtainLocationConfig-r11 ::= SEQUENCE {
 obtainLocation-r11                          ENUMERATED {setup}
```

```
 OPTIONAL -- Need OR
}
PowerPrefIndicationConfig-r11 ::= CHOICE{
 release                                  NULL,
 setup                                    SEQUENCE{
    powerPrefIndicationTimer-r11             ENUMERATED {s0, s0dot5, s1, s2, s5,
s10, s20,
                                             s30, s60, s90, s120, s300, s600, spare3,
                                             spare2, spare1}
 }
}
ReportProximityConfig-r9 ::= SEQUENCE {
 proximityIndicationEUTRA-r9                  ENUMERATED {enabled}
 OPTIONAL, -- Need OR
 proximityIndicationUTRA-r9                   ENUMERATED {enabled}
 OPTIONAL -- Need OR
}
-- ASN1STOP
-- ASN1STOP
```

OtherConfig field descriptions autonomousDenialSubframes

Indicates the maximum number of the UL subframes for which the UE 22 is allowed to deny any UL transmission. Value n2 corresponds to 2 subframes, n5 to 5 subframes and so on. E-UTRAN does not configure autonomous denial for frequencies on which SCG cells are configured.

autonomousDenialValidity

Indicates the validity period over which the UL autonomous denial subframes shall be counted. Value sf200 corresponds to 200 subframes, sf500 corresponds to 500 subframes and so on.

bw-PreferenceIndicationTimer

Prohibit timer for bandwidth preference indication reporting. Value in seconds. Value s0 means prohibit timer is set to 0 second, value s0dot5 means prohibit timer is set to 0.5 second, value si means prohibit timer is set to 1 second and so on.

delayBudgetReportingProhibitTimer

Prohibit timer for delay budget reporting. Value in seconds. Value s0 means prohibit timer is set to 0 second, value s0dot4 means prohibit timer is set to 0.4 second, and so on.

idc-Hardware SharingIndication

The field is used to indicate whether the UE 22 is allowed indicate in InDeviceCoexIndication that the cause of the problems are due to hardware sharing, and whether the UE 22 is allowed to omit the TDM assistance information.

idc-Indication

The field is used to indicate whether the UE 22 is configured to initiate transmission of the InDeviceCoexIndication message to the network.

idc-Indication-UL-CA

The field is used to indicate whether the UE 22 is configured to provide IDC indications for UL CA using the InDeviceCoexIndication message.

obtainLocation

Requests the UE 22 to attempt to have detailed location information available using GNSS. E-UTRAN configures the field only if includeLocationInfo is configured for one or more measurements.

overheatingAssistanceConfig

Configuration for the UE 22 to report assistance information to inform the eNB about UE 22 detected internal overheating.

OtherConfig field descriptions overheatingIndicationProhibitTimer

Prohibit timer for overheating assistance information reporting. Value in seconds. Value s0 means prohibit timer is set to 0 seconds, value s0dot5 means prohibit timer is set to 0.5 second, value s1 means prohibit timer is set to 1 second and so on.

flightPathInformationUpdateProhibitTimer

Prohibit timer for flight path assistance information reporting. Value indicated in seconds. Value s0 means prohibit timer is set to 0 seconds, value s0dot5 means prohibit timer is set to 0.5 seconds and so on.

autonomousDenialSubframes

Indicates the maximum number of the UL subframes for which the UE 22 is allowed to deny any UL transmission. Value n2 corresponds to 2 subframes, n5 to 5 subframes and so on. E-UTRAN does not configure autonomous denial for frequencies on which SCG cells are configured.

autonomousDenialValidity

Indicates the validity period over which the UL autonomous denial subframes shall be counted. Value sf200 corresponds to 200 subframes, sf500 corresponds to 500 subframes and so on.

powerPrefIndicationTimer

Prohibit timer for Power Preference Indication reporting. Value in seconds. Value s0 means prohibit timer is set to 0 second, value s0dot5 means prohibit timer is set to 0.5 second, value s1 means prohibit timer is set to 1 second and so on.

reportProximityConfig

Indicates, for each of the applicable Radio Access Technologies (RATs) (EUTRA, UTRA), whether or not proximity indication is enabled for CSG member cell(s) of the concerned RAT. Note.

rlmReportTimer

Prohibit timer for RLM event reporting, i.e. "early-out-of-sync" and "early-in-sync" event reporting, as specified in section 5.6.10. Value in seconds. Value s0 means prohibit timer is set to 0 second, value s0dot5 means prohibit timer is set to 0.5 second, value s1 means prohibit timer is set to 1 second and so on.

rlmReportRep-MPDCCH

The field is used to indicate whether the UE is configured to report excess repetitions on MPDCCH.

| OtherConfig field descriptions |
| --- |
| sps-AssistanceInfoReport |
| Value TRUE indicates that the UE 22 is allowed to report SPS-Assistanceinformation. |

SOME EXAMPLES

Example A1. A base station 16 configured to communicate with a wireless device 22 (UE 22), the base station 16 configured to, and/or comprising a radio interface 62 and/or comprising processing circuitry 68 configured to:
- configure the UE 22 to transmit an indicator associated with flight information in a predefined message associated with UE assistance information; and
- receive the predefined message, the predefined message including the indicator associated with the flight information.

Example A2. The base station 16 of Example A1, wherein the indicator is one of:
- a boolean value indicating whether the flight information is available;
- a boolean value indicating the flight information has been updated;
- a priority bit indicating whether an immediate rout of the UE 22 has changed significantly; and
- a bit indicating previous flight information.

Example A3. The base station 16 of Example A1, wherein the indicator indicates at least one of:
- if the flight information has changed;
- if new waypoints are available and which previously indicated waypoints are valid;
- an updated number of waypoints available at the UE 22 and/or if the updated number of waypoints is more than the previously indicated number of waypoints;
- an amount of new waypoints and if some old waypoints are not valid anymore;
- if time stamps of some waypoints have changed;
- if an updated waypoint is available which deviates from a corresponding previously indicated waypoint by a predefined threshold; and
- an update to a time stamp of a waypoint is available which deviates from a corresponding previously indicated time stamp of the waypoint by a predefined threshold.

Example B1. A method implemented in a base station 16, the method comprising:
- configuring the UE 22 to transmit an indicator associated with flight information in a predefined message associated with UE assistance information; and
- receive the predefined message, the predefined message including the indicator associated with the flight information.

Example B2. The method of Example B1, wherein the indicator is one of:
- a boolean value indicating whether the flight information is available;
- a boolean value indicating the flight information has been updated;
- a priority bit indicating whether an immediate rout of the UE 22 has changed significantly; and
- a bit indicating previous flight information.

Example B3. The method of Example B1, wherein the indicator indicates at least one of:
- if the flight information has changed;
- if new waypoints are available and which previously indicated waypoints are valid;
- an updated number of waypoints available at the UE 22 and/or if the updated number of waypoints is more than the previously indicated number of waypoints;
- an amount of new waypoints and if some old waypoints are not valid anymore;
- if time stamps of some waypoints have changed;
- if an updated waypoint is available which deviates from a corresponding previously indicated waypoint by a predefined threshold; and
- an update to a time stamp of a waypoint is available which deviates from a corresponding previously indicated time stamp of the waypoint by a predefined threshold.

Example C1. A wireless device 22 (UE 22) configured to communicate with a base station, the UE 22 configured to, and/or comprising a radio interface 62 and/or processing circuitry 68 configured to:
- receive at least one update to flight information associated with the UE 22; and
- determine whether to transmit an indicator associated with the at least one update to the flight information in a predefined message associated with UE assistance information.

Example C2. The UE 22 of Example C1, wherein the indicator is one of:
- a boolean value indicating whether the flight information is available;
- a boolean value indicating the flight information has been updated;
- a priority bit indicating whether an immediate rout of the UE 22 has changed significantly; and
- a bit indicating previous flight information.

Example C3. The UE 22 of Example C1, wherein the indicator indicates at least one of:
- if the flight information has changed;
- if new waypoints are available and which previously indicated waypoints are valid;
- an updated number of waypoints available at the UE 22 and/or if the updated number of waypoints is more than the previously indicated number of waypoints;
- an amount of new waypoints and if some old waypoints are not valid anymore;
- if time stamps of some waypoints have changed;
- if an updated waypoint is available which deviates from a corresponding previously indicated waypoint by a predefined threshold; and
- an update to a time stamp of a waypoint is available which deviates from a corresponding previously indicated time stamp of the waypoint by a predefined threshold.

Example D1. A method implemented in a wireless device 22 (UE 22), the method comprising:
- receiving at least one update to flight information associated with the UE 22; and
- determining whether to transmit an indicator associated with the at least one update to the flight information in a predefined message associated with UE assistance information.

Example D2. The method of Example D1, wherein the indicator is one of:
- a boolean value indicating whether the flight information is available;
- a boolean value indicating the flight information has been updated;
- a priority bit indicating whether an immediate rout of the UE 22 has changed significantly; and
- a bit indicating previous flight information.

Example D3. The method of Example D1, wherein the indicator indicates at least one of:
- if the flight information has changed;
- if new waypoints are available and which previously indicated waypoints are valid;
- an updated number of waypoints available at the UE 22 and/or if the updated number of waypoints is more than the previously indicated number of waypoints;
- an amount of new waypoints and if some old waypoints are not valid anymore;
- if time stamps of some waypoints have changed;
- if an updated waypoint is available which deviates from a corresponding previously indicated waypoint by a predefined threshold; and
- an update to a time stamp of a waypoint is available which deviates from a corresponding previously indicated time stamp of the waypoint by a predefined threshold.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment comprising processing circuitry configured to:
   - determine whether to transmit an indication indicating that flight path information at least one of is available and has changed; and
   - transmit, in connected mode, the indication based at least in part on the determination,
     - wherein the indication is included in an information element (IE) configured to provide assistance information, the assistance information being associated with power preference indications, bandwidth preference information, semi-persistent scheduling (SPS) information, radio link monitoring (RLM) events, delay budget report, and overheating assistance information,
     - wherein the indication indicates waypoint information associated with the flight plan information, and wherein the waypoint information indicates a quantity of new waypoints and if an updated number of waypoints is more than the previously indicated number of waypoints.

2. The user equipment of claim 1, wherein the determination whether to transmit the indication is based at least in part on whether an update to the flight path information is received from an application layer.

3. The user equipment of claim 1, wherein the waypoint information indicates at least one of:
if new waypoints are available;
which previously indicated waypoints are valid;
the updated number of waypoints;
if time stamps of some waypoints have changed;
if an updated waypoint is available which deviates from a corresponding previously indicated waypoint by a predefined threshold; and
an update to a time stamp of a waypoint is available which deviates from a corresponding previously indicated time stamp of the waypoint by a predefined threshold.

4. The user equipment of claim 1, wherein connected mode corresponds to radio resource control (RRC) connected mode.

5. A base station comprising processing circuitry configured to receive an indication from a user equipment in connected mode, the indication indicating that flight path information at least one of is available and has changed,
wherein the indication is included in an information element (IE) configured to provide assistance information, the assistance information being associated with power preference indications, bandwidth preference information, semi-persistent scheduling (SPS) information, radio link monitoring (RLM) events, delay budget report, and overheating assistance information,
wherein the indication indicates waypoint information associated with a flight plan, and
wherein the waypoint information indicates a quantity of new waypoints and if an updated number of waypoints is more than the previously indicated number of waypoints.

6. The base station of claim 5, wherein the waypoint information indicates at least one of:
if new waypoints are available;
which previously indicated waypoints are valid;
the updated number of waypoints;
if time stamps of some waypoints have changed;
if an updated waypoint is available which deviates from a corresponding previously indicated waypoint by a predefined threshold; and
an update to a time stamp of a waypoint is available which deviates from a corresponding previously indicated time stamp of the waypoint by a predefined threshold.

7. The base station of claim 5, wherein connected mode corresponds to radio resource control (RRC) connected mode.

8. A method implemented in a user equipment, the method comprising:
determining whether to transmit an indication indicating that flight path information at least one of is available and has changed; and
transmitting, in connected mode, the indication based at least in part on the determination,
wherein the indication is included in an information element (IE) configured to provide assistance information, the assistance information being associated with power preference indications, bandwidth preference information, semi-persistent scheduling (SPS) information, radio link monitoring (RLM) events, delay budget report, and overheating assistance information,
wherein the indication indicates waypoint information associated with the flight plan information, and
wherein the waypoint information indicates a quantity of new waypoints and if an updated number of waypoints is more than the previously indicated number of waypoints.

9. The method of claim 8, wherein the determination whether to transmit the indication is based at least in part on whether an update to the flight path information is received from an application layer.

10. The method of claim 8, wherein the waypoint information indicates at least one of:
if new waypoints are available;
which previously indicated waypoints are valid;
the updated number of waypoints;
if time stamps of some waypoints have changed;
if an updated waypoint is available which deviates from a corresponding previously indicated waypoint by a predefined threshold; and
an update to a time stamp of a waypoint is available which deviates from a corresponding previously indicated time stamp of the waypoint by a predefined threshold.

11. The method of claim 8, wherein connected mode corresponds to radio resource control (RRC) connected mode.

12. A method implemented in a base station, the method comprising receiving an indication from a user equipment in connected mode, the indication indicating that flight path information at least one of is available and has changed,
wherein the indication is included in an information element (IE) configured to provide assistance information, the assistance information being associated with power preference indications, bandwidth preference information, semi-persistent scheduling (SPS) information, radio link monitoring (RLM) events, delay budget report, and overheating assistance information,
wherein the indication indicates waypoint information associated with a flight plan, and
wherein the waypoint information indicates a quantity of new waypoints and if an updated number of waypoints is more than the previously indicated number of waypoints.

13. The user equipment of claim 1, wherein the waypoint information further indicates if some old waypoints are invalid.

* * * * *